United States Patent [19]
Smith, Jr.

[11] 3,978,255
[45] Aug. 31, 1976

[54] FOLDABLE COMPOSITE REINFORCING MEMBER FOR USE IN A FOAM STRUCTURE

[75] Inventor: Hubert Stacy Smith, Jr., Bay City, Mich.

[73] Assignee: The Dow Chemical Company, Midland, Mich.

[22] Filed: Oct. 24, 1974

[21] Appl. No.: 517,701

[52] U.S. Cl. .................................. 428/47; 428/77; 428/81; 428/119; 428/121; 428/255; 428/322; 264/32; 264/46.2; 52/309; 52/615
[51] Int. Cl.² ...................... B32B 3/10; E04C 1/00; E04C 2/34
[58] Field of Search .............. 161/145, 38; 428/322, 428/81, 255, 53, 119, 57, 61, 121, 77; 264/32, 46.2; 52/80, 82, 309, 615, 618

[56] References Cited
UNITED STATES PATENTS

| | | |
|---|---|---|
| 2,009,056 | 7/1935 | Schaffert .................... 161/145 X |
| 2,314,523 | 3/1943 | Speer ........................ 161/145 X |
| 2,777,786 | 1/1957 | Schwartz et al. ............. 161/145 X |
| 2,966,436 | 12/1960 | Fox et al. .................. 161/145 X |
| 3,331,173 | 7/1967 | Elsner ....................... 428/322 X |
| 3,443,276 | 5/1969 | Smith et al. ................. 264/32 X |
| 3,519,523 | 7/1970 | Rodman et al. .............. 161/145 X |

*Primary Examiner*—Philip Dier
*Attorney, Agent, or Firm*—Robert B. Ingraham

[57] ABSTRACT

Walled structures are prepared from foam-in-place components such as those used to prepare rigid polyurethane foams wherein successive strips of foam are deposited and hardened within a three-sided enclosure having a generally H-shaped configuration. A foraminous scrim such as glass fiber mesh forms part of the vertical legs of the H and foam is disposed below the cross piece of the H to bond to adjacent scrim facing sheets and scrim of a previously disclosed strip. The foam is significantly reinforced, joined to the previously deposited structure and foaming components are isolated from depositing apparatus.

4 Claims, 7 Drawing Figures

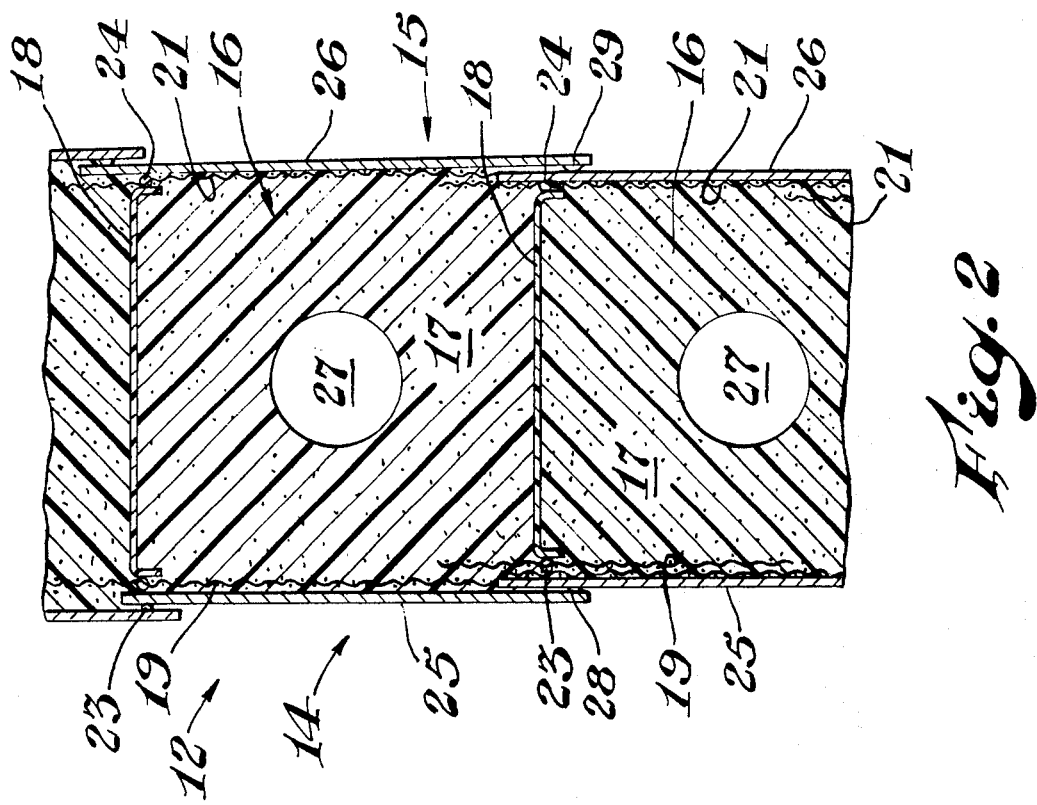
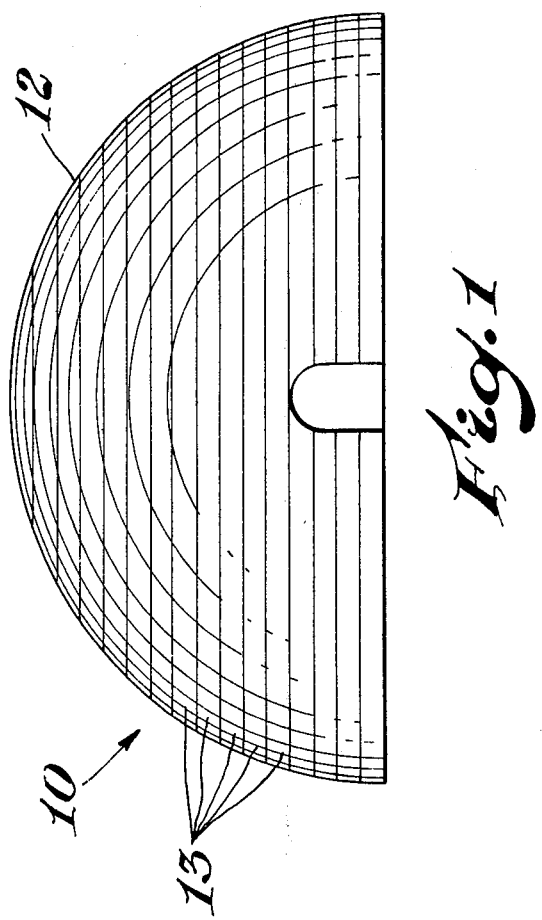
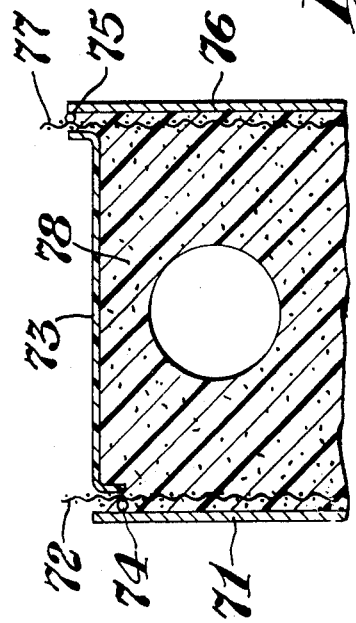

FOLDABLE COMPOSITE REINFORCING MEMBER FOR USE IN A FOAM STRUCTURE

Foam plastic structures which are prepared by depositing successive formed strips of foam in edge-to-edge relationship, one on top of the other, are known and have found use in a number of structural applications. One particularly desirable variety of such a foamed structure is prepared by depositing successive layers of a foamable hardenable composition, such as a polyurethane foaming composition, to provide a plurality of strips of foam plastic material bonded to each other to form a structure of a desired configuration. One particularly conveniently formed configuration is that of a dome wherein the strips are deposited in a generally spiral-helical fashion to form a monolithic dome or similar configuration. The preparation of structures employing hardenable foamable compositions by a spiral generation technique is well known and described in U.S. Pat. No. 3,336,631, 3,423,791 and 3,443,276; the teachings of which are herewith incorporated by reference thereto.

Plastic foam provides a highly desirable structure, however, in the interest of preparing a structure of maximum thermal insulation value, size and strength with minimum material, it is often desirable to use a plastic foam of relatively low density, for example, in the density range of from about 3 to 10 pounds per cubic foot. Usually, the lower the density the more desirable the thermal insulating properties, with higher densities, greater physical properties are obtained and the cost of materials used in building a structure increases. Generally it is found desirable to incorporate within such foam structures reinforcements such as wire, glass fibers or the like. Usually, it is desirable, on such foam structures, to provide an external skin of metal, fabric or other ultraviolet light and mechanical damage resistant materials. Oftentimes in the preparation of foamed structure from liquid foamable hardenable compositions, difficulty has been encountered during extended operation wherein the hardenable material adheres to parts of the depositing apparatus and gradually builds up to a point where it is necessary to stop foam deposition and clean the depositing apparatus of adhered foam. Such cleaning procedures are generally time consuming and expensive.

It would be desirable if there were available an improved method for the preparation of foamed structures employing foamable hardenable compositions.

It would also be desirable if there were available an improved method for the preparation of structures from liquid foamable hardenable materials wherein the deposited foamable hardenable material would not contact the foam depositing apparatus.

It would also be desirable if there were available an improved reinforced structure prepared by the deposition of successive strips of a foamable hardenable liquid composition.

It would be further desirable if there were available an improved reinforcing member for incorporation into a structure prepared by the successive deposition of a plurality of foam layers from a foamable hardenable liquid composition.

These benefits and other advantages in accordance with the present invention are achieved in a method for the preparation of a structure by the successive deposition of a plurality of strips of foam, the foam being obtained from a foamable hardenable liquid composition deposited on a previously deposited strip of foam, the improvement which comprises providing a reinforcement member, the reinforcement member comprises in cooperative combination, a first skin member, a second skin member, a transverse member and at least first and second foraminous sheet members, the first skin member and first reinforcing member being in generally overlapping face-to-face relationship, the second skin member and second reinforcing member being in generally face-to-face overlapping relationship, a transverse member having a first edge portion and a second edge portion, the first edge portion being affixed to the first reinforcing member, the second edge portion being affixed to the second reinforcing member, the first skin member being affixed to the first reinforcing member at a location generally about the location of attachment of the first edge of the transverse member to the first reinforcing member, the second skin member being affixed to the second reinforcing member in a region generally adjacent the region of attachment of the second edge of the transverse member to the second reinforcing member, the first and second reinforcing member projecting beyond the adjacent portions of the first and second skin members at a location generally adjacent to the location of attachment to the first skin member and first reinforcing member and second skin member and reinforcing member respectively, the first and second skin members being disposed in generally opposed parallel relationship, the first and second reinforcing members being disposed in generally overlapping relationship with a previously deposited strip to form a closed channel, depositing foamable hardenable material within the closed channel and permitting said foamable hardenable material to contact first and second reinforcing members and adjacent skins and transverse member.

Also contemplated within the scope of the present invention is a reinforcement member, the reinforcement member comprises in cooperative combination, a first skin member, a second skin member, a transverse member and at least first and second foraminous sheet members, the first skin member and first reinforcing member being in generally overlapping face-to-face relationship, the second skin member and second reinforcing member being in generally face-to-face overlapping relationship, a transverse member having a first edge portion and a second edge portion, the first edge portion being affixed to the first reinforcing member, the second edge portion being affixed to the second reinforcing member, the first skin member being affixed to the first reinforcing member at a location generally about the location of attachment of the first edge of the transverse member to the first reinforcing member, the second skin member being affixed to the second reinforcing member in a region generally adjacent the region of attachment of the second edge of the transverse member to the second reinforcing member, the first and second reinforcing member projecting beyond the adjacent portions of the first and second skin members at a location generally adjacent to the location of attachment to the first skin member and first reinforcing member and second skin member and reinforcing member respectively.

Further features and advantages to the present invention will become more apparent from the following specification when taken in connection with the drawing wherein:

FIG. 1 is a schematic simplified representation of a structure of the present invention.

FIG. 2 is a partial sectional view of the wall of the structure of FIG. 1.

Figure 3:
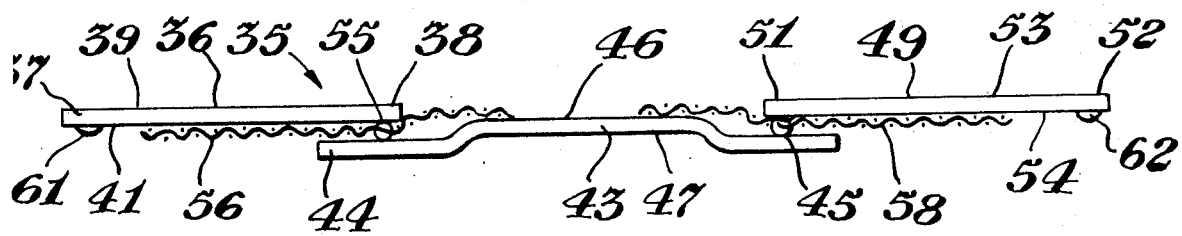

FIG. 3 schematically depicts an end view of a reinforcement and containment assembly of the present invention.

Figure 4:
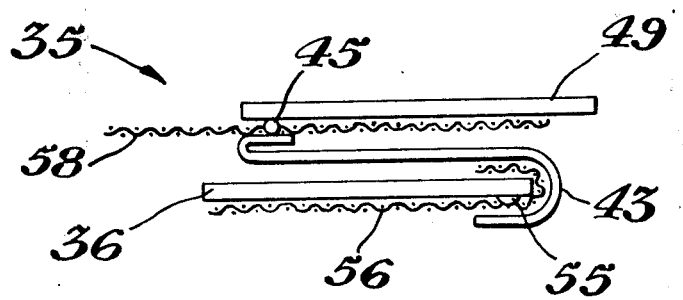

FIG. 4 schematically depicts the reinforcement end containment of FIG. 3 in a folded position.

Figure 5:
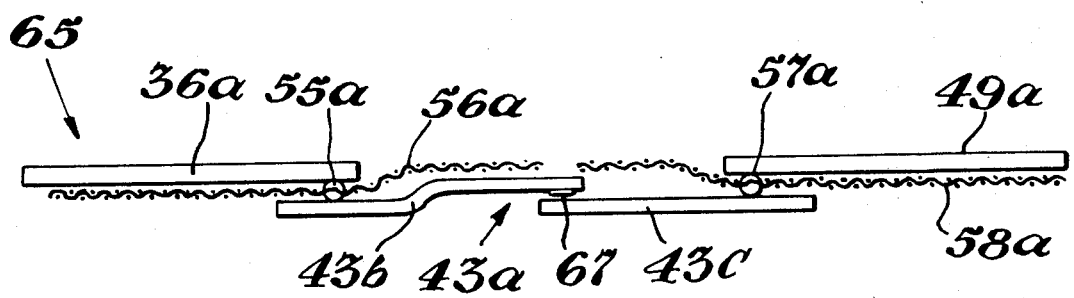
Figure 6:
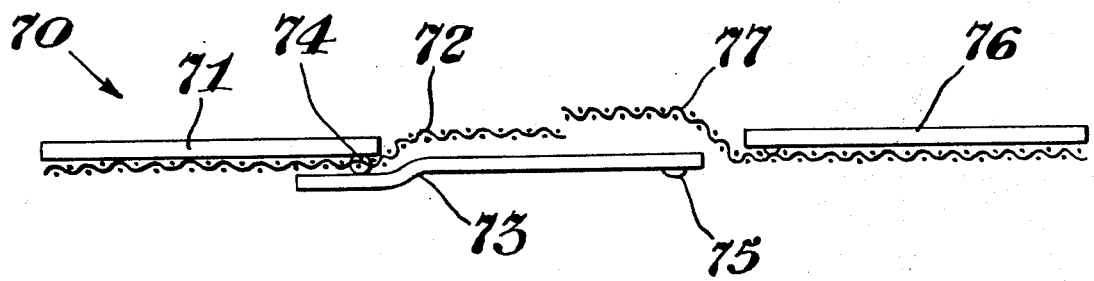

FIGS. 5 and 6 are end views of alternate containment and reinforcement members.

In FIG. 1 there is schematically depicted a structure in accordance with the present invention generally designated by the reference numeral 10. Structure 10 comprises a generally hemispheric wall 12. The wall 12 is composed of a plurality of turns or strips 13 of reinforced insulating material.

In FIG. 2 there is schematically depicted a sectional view of a portion of the wall 12 of FIG. 1. The wall 12 has an exterior surface 14 and an interior surface 15. The wall 12 comprises a plurality of strips or loops 16 comprising a synthetic resinous foam portion 17. Between adjacent edges of strips 17 are disposed transverse reinforcing and containment members 18 extending generally from the outer surface 14 to the inner surface 15. A first reinforcing foraminous sheet 19 such as a gloss fiber scrim is disposed generally adjacent the outer surface 14 and a second generally foraminous reinforcing sheet 21 such as a gloss fiber scrim is disposed adjacent the inner surface 15. Portions of the foraminous sheets 19 and 21 are embedded generally within the foam portions 16 and the remaining portions of each of the foaminous sheets 19 and 21 are embedded in adjacent foam strips 16 to provide a mechanical bond therebetween. The foraminous reinforcing members 19 and 21 are bonded to transverse containment members 18 at locations 23 and 24 respectively. An external skin or containment sheet 25 is disposed immediately adjacent the reinforcing member 19 and adhered thereto by foam 17 passing through the foraminous member 19.

An inner skin member 26 similarly is bonded to the reinforcement member 21 by the foam 17. Conveniently a passageway 27 is defined within the foam 17. Vertically adjacent skins 25 are bonded to each other by means of an adhesive bead 28 conveniently of heat activatable adhesive material. A similar heat sealable bead 29 joins overlapping portions of adjacent inner skins 26. The wall as depicted in FIG. 2 provides rigid construction wherein adjacent loops or turns of foam are mechanically interlocked by means of the overlapping foraminous reinforcing sheets 19 and 21. The transverse containment member 18 aids in providing shaping of the foam when initially laid down and before curing. The skin members 25 and 26 and the transverse containment member 18 provide three sides of a channel to which fresh foam is deposited. The remaining fourth side of the channel is formed by the containment member 18 of the previously deposited strip. Thus a hardenable foamable forming composition is readily deposited within the channel and the skin members 25 and 26 and containing member 18 are used to prevent contact of the foaming material with the application apparatus which conveniently may be of the variety described in the hereinbefore cited patent references.

In FIG. 3 there is depicted an end view of the reinforcing and containment element generally designated by the reference numeral 35. The reinforcing element 35 is an assembly which conveniently may be employed to prepare a wall such as that depicted in FIG. 2. The assembly 35 comprises a first or outer skin strip 36 having a first edge 37 and a second edge 38, a first surface 39 and a second surface 41, a transverse or containment element 43 having a first edge 44, a second edge 45 and a first surface 46 and a second surface 47. A second skin strip 49 having a first edge 51, a second edge 52, a first surface 53, and a second surface 54. A first foraminous reinforcing strip 56 is disposed generally adjacent the first strip 36 and the transverse containment strip 43. Reinforcing strip 56 overlaps a major portion of the second surface 41 of the first strip 36 and extends beyond the second edge of the first strip 36 over the first surface 46 or the transverse reinforcing and containment member 43. The first strip 36 is adhered to the containment member 43 at the second edge 38 of the first strip 36 and the first edge 44 of the containment member 43 and by means of adhesive 55 joins the reinforcing strip 56. A second reinforcing strip 58 is similarly disposed between the second surface 54 adjacent the first edge 51 of the strip 49 and the first face 46 adjacent the second edge 45 of the containment member 43. A first heat activatable adhesive bead or body 61 is disposed adjacent first edge 37 of the first skin 36 on the second surface 41 thereof. A similar adhesive bead 62 is disposed adjacent the second edge 52 on the second surface 54 of the second skin strip 49.

In FIG. 4 there is depicted a second end view of the member 35 folded in a manner suitable for deposition on a supply roll.

In FIG. 5 there is schematically depicted an alternate reinforcing containment strip in accordance with the invention generally designated by the reference numeral 65. The strip 65 has a first skin member 36a, a second skin member 49a, a transverse containment member 43a comprising a first portion 43b affixed to strip member 36a by adhesive 55a which incorporates foraminous reinforcing member 56a. A second containment portion 43c is disposed adjacent thereto and affixed to the first skin member 49a by an adhesive 57a which incorporates foraminous reinforcing strip 58a. Remote from the strip 36a, portion 43b has a heat activatible adhesive bead 67.

The embodiment of FIG. 5 is in essence generally identical of FIG. 3 with the exception that the transverse containment member 43 is formed in two portions 43b and 43c. The portion 43b has heat activatable adhesive bead 67 disposed thereon.

The embodiment of FIG. 5 is particularly desirable where operating space is limited and it is desired to provide the skins in transverse containment in narrower strips which require less space to interfold and refold to the desired channel-like configuration.

Advantageously two halves of the strip 65 may be separately fed to a foam depositing head in the portions 43b and 43c heat sealed to provide the desired channel configuration.

In FIG. 6 there is depicted an alternate embodiment invention designated by the reference numeral 70. The outer or skin strip 71 is in face to face relationship with a portion of the foraminous reinforcing strip 72. The foraminous reinforcing strip 72 partially overlies a transverse containment strip 73 generally in the manner of strips 36a, 43a and 56a of FIG. 3 and are joined in a similar manner by adhesive 74. An inner skin 76 is remotely disposed from strip 71 and partially overlaps and adhered thereto is a foraminous reinforcing sheet 77. The strip 73, remote from the adhesive 74, has a bead of heat activatable adhesive 75.

FIG. 7 depicts a sectional view of a deposited foam strip 78 employing the strip 70 of FIG. 6. FIG. 7 depicts the location of the external strip 71, its associated foraminous reinforcing scrim or web 72, the transverse containment member 73, the inner skin 76, the inner skin reinforcing scrim 77, and the heat activatable adhesive 75 bonded to the foraminous strip 77 and skin 76.

The embodiment of the invention as depicted in FIGS. 6 and 7 is particularly convenient where no ready access is available to the channel in which the foam is being deposited or is particularly desirable when the system is being used under conditions which permit wide variation and temperature and feed rates of the foamable material may be erratic. No internal support is needed for the formation of a seal using the adhesive 75.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the heretoappended claims.

What is claimed is:

1. A reinforcement member which can be folded and rolled and is particularly suited for the preparation of structures by the spiral generation technique, the reinforcement member comprises in cooperative combination,
    a first skin member,
    a second skin member,
    a transverse member and
    at least first and second foraminous sheet members, the first skin member and first sheet member being in generally overlapping face-to-face relationship, the second skin member and second reinforcing member being in generally face-to-face overlapping relationship,
    the transverse member having
    a first edge portion and
    a second edge portion, the first edge portion being affixed to the first reinforcing member, the second edge portion being affixed to the second reinforcing member, the first skin member being affixed to the first reinforcing member at a location generally about the location of attachment of the first edge of the transverse member to the first reinforcing member, the second skin member being affixed to the second reinforcing member in a region generally adjacent the region of attachment of the second edge of the transverse member to the second reinforcing member, the first and second reinforcing member projecting beyond the adjacent portions of the first and second skin members at a location generally adjacent the location of attachment to the first skin member and first reinforcing member and second skin member and reinforcing member respectively, with the further limitation that the skin members will prevent contact of a foaming material contained thereby with application apparatus and the reinforcement can be folded and rolled.

2. The member of claim 1 wherein the first foraminous sheet member is a glass fiber scrim.

3. The member of claim 1 wherein the first and second foraminous sheet member and the transverse member are glass fiber scrim.

4. The member of claim 1 wherein the transverse member comprises first and second unattached portions which are adapted to overlap.

* * * * *